United States Patent
Yun et al.

(10) Patent No.: US 12,249,738 B1
(45) Date of Patent: Mar. 11, 2025

(54) RECHARGEABLE LITHIUM BATTERY

(71) Applicant: SAMSUNG SDI CO., LTD., Yongin-si (KR)

(72) Inventors: Pilsang Yun, Yongin-si (KR); Do-Yu Kim, Yongin-si (KR); Hyunbeom Kim, Yongin-si (KR); Sangin Park, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 176 days.

(21) Appl. No.: 18/060,791

(22) Filed: Dec. 1, 2022

(30) Foreign Application Priority Data

Dec. 3, 2021 (KR) .................. 10-2021-0172279

(51) Int. Cl.
| | |
|---|---|
| *H01M 50/578* | (2021.01) |
| *H01M 4/02* | (2006.01) |
| *H01M 4/36* | (2006.01) |
| *H01M 4/525* | (2010.01) |
| *H01M 4/58* | (2010.01) |
| *H01M 10/052* | (2010.01) |
| *H01M 10/0567* | (2010.01) |

(Continued)

(52) U.S. Cl.
CPC .......... *H01M 50/578* (2021.01); *H01M 4/366* (2013.01); *H01M 4/525* (2013.01); *H01M 4/5825* (2013.01); *H01M 10/052* (2013.01); *H01M 10/0567* (2013.01); *H01M 50/117* (2021.01); *H01M 50/1243* (2021.01); *H01M 50/157* (2021.01); *H01M 50/164* (2021.01); *H01M 2004/028* (2013.01); *H01M 2200/20* (2013.01)

(58) Field of Classification Search
CPC .......... H01M 10/052; H01M 10/0567; H01M 4/366; H01M 4/525; H01M 4/5825; H01M 50/578; H01M 50/157; H01M 50/1243; H01M 50/164; H01M 50/117
See application file for complete search history.

(56) References Cited

U.S. PATENT DOCUMENTS 10,109,889 B2 * 10/2018 Hattori .................... H01M 4/62
2018/0159109 A1 * 6/2018 Tsubouchi ........ H01M 10/0525
(Continued)

FOREIGN PATENT DOCUMENTS

| JP | 4417649 B2 | 2/2010 |
|---|---|---|
| KR | 10-2007-0047860 A | 5/2007 |

(Continued)

OTHER PUBLICATIONS

European Extended Search Report issued in corresponding application No. EP22210782.3, dated Jul. 20, 2023, 6 pages.
(Continued)

*Primary Examiner* — Karie O'Neill Apicella
(74) *Attorney, Agent, or Firm* — Womble Bond Dickinson (US) LLP (57) ABSTRACT

A rechargeable lithium battery includes: a positive electrode; a negative electrode; a separator between the positive electrode and the negative electrode; an electrolyte including vinylene carbonate; and a case accommodating the positive electrode, the negative electrode, the separator, and the electrolyte. At least in a portion of an interior of the case has a coating portion containing lithium borate particles.

13 Claims, 4 Drawing Sheets

(51) Int. Cl.
  *H01M 50/117* (2021.01)
  *H01M 50/124* (2021.01)
  *H01M 50/157* (2021.01)
  *H01M 50/164* (2021.01)

(56) References Cited

U.S. PATENT DOCUMENTS

2021/0253602 A1* 8/2021 Zhang ................. H01M 50/105
2022/0271283 A1   8/2022 Sun et al.

FOREIGN PATENT DOCUMENTS

| KR | 2007047860 A * | 5/2007 | .......... H01M 10/052 |
| KR | 10-2017-0069071 A | 6/2017 | |
| KR | 10-2019-0079526 A | 7/2019 | |
| WO | WO-2021006520 A1 * | 1/2021 | ............. C01G 53/00 |

OTHER PUBLICATIONS

Korean Office Action for KR Application No. 10-2021-0172279, dated Jun. 3, 2024, 6 pages.

* cited by examiner

RECHARGEABLE LITHIUM BATTERY

CROSS-REFERENCE TO RELATED APPLICATION

This application claims priority to and the benefit of Korean Patent Application No. 10-2021-0172279, filed in the Korean Intellectual Property Office on Dec. 3, 2021, the entire content of which is incorporated herein by reference.

BACKGROUND

1. Field

Aspects of embodiments of the present disclosure relate to a rechargeable lithium battery.

2. Description of the Related Art

Portable information devices, such as a cell phone, a laptop, smart phone, and the like, or electric vehicles, often use a rechargeable lithium battery having high energy density and easy portability as a source of driving power. Recently, research has been actively conducted into using a rechargeable lithium battery with high energy density as a driving power source or power storage power source for hybrid or electric vehicles.

However, as the rechargeable lithium battery is commercialized in various fields, an overcharge problem in which the rechargeable lithium battery is charged in excess of a specified voltage value may occur. When overcharged, an internal pressure and a temperature of the rechargeable lithium battery may increase due to a chemical reaction of internal materials of the battery, which may lead to accidents, such as thermal runaway and the like. To mitigate or prevent these events, the battery may be internally equipped with a system of cutting off a current when the internal pressure and the temperature of the battery reach a reference value or higher.

However, a temperature-sensing/current-cut-off system, which cuts off a current when the internal temperature of the battery reaches the reference value or higher, generally operate at a temperature of about 60° C. or less. When the operation temperature is set to be higher than about 60° C., the current-cut-off system often operates late and has limited utility in in securing overcharge safety.

Another temperature-sensing/current-cut-off system, which cuts off a current when the internal pressure of the battery reaches the reference value or higher, may not properly work when the internal pressure of the battery rises at an insufficiently fast rate even after the overcharge, leading to accidents, such as explosion after the battery is left and the like.

SUMMARY

There is a need for a rechargeable lithium battery system equipped with a safety device that quickly operates during the overcharge to secure safety. A rechargeable lithium battery having secured overcharge safety by quickly operating a safety device when overcharging that exceeds a specified voltage value is provided.

In an embodiment, a rechargeable lithium battery includes: a positive electrode; a negative electrode; a separator between the positive electrode and the negative electrode; an electrolyte including vinylene carbonate; and a case accommodating them. At least in a portion of the interior of the case includes a coating portion containing lithium borate particles.

In the rechargeable lithium battery according to an embodiment, when a large amount of gas is generated during overcharging and the pressure is sufficiently increased, an overcharge safety device operates quickly to cut off the current and, thus, overcharge safety is secured. In addition, excellent performance may be realized during operation.

DETAILED DESCRIPTION

Hereinafter, embodiments of the present disclosure will be described in detail so that those of ordinary skill in the art can easily implement them. However, this disclosure may be embodied in many different forms and is not limited to the embodiments set forth herein.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

In addition, "layer" as used herein includes not only a shape formed on the whole surface when viewed from a plan view but also a shape formed on a partial surface.

In addition, the average particle diameter may be measured by a method well known to those skilled in the art, for example, may be measured by a particle size analyzer or may be measured by a transmission electron micrograph or a scanning electron micrograph. Alternatively, an average particle diameter value may be obtained by measuring using a dynamic light scattering method, performing data analysis, counting the number of particles for each particle size range, and calculating from this. Unless otherwise defined, the average particle diameter means the diameter (D50) of particles having a cumulative volume of 50 volume % in the particle size distribution as measured by a particle size analyzer.

In an embodiment, a rechargeable lithium battery includes: a positive electrode; a negative electrode; a separator between the positive electrode and the negative electrode; an electrolyte including vinylene carbonate; and a case configured to accommodate them. At least in a portion of the interior of the case includes a coating portion containing lithium borate particles.

When a rechargeable lithium battery is charged with an abnormal voltage of a specified voltage or more, for example, in a range of about 4.5 V to about 5.0 V, for example, about 4.7 V or more, or about 4.8 V or more, the battery internally generates a large amount of gas, which causes an overcharge safety device to quickly operate to cut off current and heat transfers, thereby, preventing accidents, such as fire and the like. However, below the specified voltage, because there is no or very little additional gas generation, the battery may be brought back to the normal operation and exhibit excellent performance, such as cycle-life characteristics and the like.

When an additive, such as vinylene carbonate and the like, is used in the electrolyte, a cycle-life of the battery is reportedly improved. However, these electrolyte additives may have an effect of reducing the amount of generated gas during the overcharge. Accordingly, because the safety device may not operate because the internal pressure of the battery does not rise at a sufficiently fast rate, there may be problems, such as thermal runaway after the overcharge continues and the like.

Accordingly, in an embodiment, because vinylene carbonate is added to the electrolyte and at the same time a coating portion including lithium borate is applied in the case, gas may not be generated below a specified voltage, cycle-life characteristics are improved, a large amount of gas is generated only when charging at a specified voltage or higher, for example, 4.5 V or higher, to ensure that the safety device operates quickly, securing overcharge safety of the rechargeable lithium battery and improving battery performance, such as cycle-life characteristics. It is understood that in the overvoltage range, the vinylene carbonate in the electrolyte and lithium borate in the coating portion cause a chemical reaction to generate a large amount of gas. For example, when the rechargeable lithium battery is charged with an overvoltage of greater than or equal to about 5.0 V, an amount of gas generated per battery weight may be greater than or equal to about 1.0 cc/g.

Coating Portion in the Interior of the Case

The coating portion on at least a portion in the interior of the case includes lithium borate. The lithium borate may be expressed as lithium boron oxide or lithium borate, for example, $LiBO_2$, $Li_3B_7O_{12}$, $Li_6B_4O_9$, $Li_3B_{11}O_{18}$, $Li_2B_4O_7$, $Li_3BO_3$, $Li_8B_6O_{13}$, $Li_5B_3O_7$, $Li_4B_2O_5$, $Li_{10}B_4O_{11}$, $Li_8B_2O_7$, or a combination thereof. These lithium borate compounds are understood not to affect the battery's operation during normal operation but react with vinylene carbonate in the electrolyte during an overvoltage charge at about 4.5 V or higher and, thus, generate a large amount of gas.

The lithium borate may be a compound having a redox potential of about 4.5 V or higher. The lithium borate having an oxidation-reduction potential of about 4.5 V or higher may be, for example, $LiBO_2$, $Li_3B_7O_{12}$, $Li_6B_4O_9$, $Li_3B_{11}O_{18}$, $Li_2B_4O_7$, or a combination thereof. These compounds may exhibit high phase stability even in an overvoltage range of about 4.5 V or higher. For example, the lithium borate may include $LiBO_2$.

Table 1 below shows oxidation reduction potentials and reaction schemes of $Li_3B_7O_{12}$, $Li_6B_4O_9$, $Li_3B_{11}O_{18}$, $Li_2B_4O_7$, and $LiBO_2$ from among the lithium borates. Referring to Table 1, the compounds have an oxidation reduction potential of about 4.5 V or higher, for example, greater than or equal to about 5.0 V or greater than or equal to about 5.1 V, which is generally higher than an operation potential of a battery. Accordingly, the compounds may have high phase stability in the overvoltage range and cause no side reaction during the overvoltage but will accelerate the gas generation through reaction with vinylene carbonate in the electrolyte solution.

TABLE 1

| | Redox Potential (V) | Redox Reaction Scheme |
|---|---|---|
| $Li_3B_7O_{12}$ | 5.09 | $11Li_3B_7O_{12} = 7Li_3B_{11}O_{18} + 12Li + 3O_2$ |
| $Li_6B_4O_9$ | 5.18 | $2Li_6B_4O_9 = 8LiBO_2 + 4Li + O_2$ |
| $Li_3B_{11}O_{18}$ | 5.52 | $4Li_3B_{11}O_{18} = 22B_2O_3 + 12Li + 3O_2$ |
| $Li_2B_4O_7$ | 5.11 | $14Li_2B_4O_7 = 8Li_3B_7O_{12} + 4Li + O_2$ |
| $LiBO_2$ | 5.23 | $8LiBO_2 = 2Li_2B_4O_7 + 4Li + O_2$ |

The lithium borate in the coating portion may be present in the form of particles. Herein, the lithium borate particles may have an average particle diameter (D50) of about 10 μm or less, for example, about 1 μm to about 10 μm, about 2 μm to about 9 μm, about 3 μm to about 8 μm, or about 4 μm to about 7 μm. When the lithium borate particles have an average particle diameter within these ranges, the lithium borate particles may be easily processed, improve durability and cycle-life of the coating portion, and react well with the electrolyte during the overcharge to generate a large amount of gas. The average particle diameter may be measured with a particle size analyzer and may be represented as a diameter (D50) of particles at an accumulated volume of 50 volume % in a particle distribution.

The coating portion may be disposed on at least a portion in the interior of the case at where the case contacts the electrolyte. Accordingly, the lithium borate of the coating portion contacts the vinylene carbonate and the like of the electrolyte to cause a chemical reaction in the overvoltage range.

The coating portion may be any portion of the interior of the case contacting the electrolyte without any particular limit. For example, the coating portion may be on at least either one inner wall of the case and the cap plate.

Electrolyte

The electrolyte, according to an embodiment, includes vinylene carbonate (VC). The vinylene carbonate in the electrolyte contributes to improving the cycle-life characteristics of the battery without generating gas in the normal voltage range while a large amount of gas is generated upon contact with the coating portion only when overvoltage occurs.

The vinylene carbonate may be included in an amount of about 0.1 wt % to about 5 wt %, for example, about 0.2 wt % to about 4 wt %, about 0.5 wt % to about 3 wt %, or about 0.8 wt % to about 2 wt %, based on the total weight of the electrolyte. When vinylene carbonate is included in the above range, safety may be secured by increasing the amount of gas generated during overcharging while improving general performance, such as cycle-life characteristics of the battery.

The electrolyte may further include a non-aqueous organic solvent and a lithium salt in addition to vinylene carbonate.

A content of the vinylene carbonate may be about 0.1 parts by weight to about 5 parts by weight, about 0.3 parts by weight to about 4 parts by weight, about 0.5 parts by weight to about 3 parts by weight, or about 0.8 parts by weight to about 2 parts by weight based on the total weight, 100 parts by weight of the non-aqueous organic solvent and the lithium salt.

The non-aqueous organic solvent acts as a medium for transmitting ions taking part in the electrochemical reaction of a battery. The non-aqueous organic solvent may be a carbonate-based, ester-based, ether-based, ketone-based, or alcohol-based solvent, or aprotic solvent. The carbonate-based solvent may be dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), and the like. The ester-based solvent may be methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. In addition, the alcohol-based solvent may be ethyl alcohol, isopropyl alcohol, etc., and the aprotic solvent may be nitriles such as R—CN (where R is a C2 to C20 linear, branched, or cyclic hydrocarbon group and may include a double bond, an aromatic ring, or an ether bond), amides, such as dimethylformamide, dioxolanes, such as 1,3-dioxolane, sulfolanes, and the like.

The non-aqueous organic solvent may be used singularly or in a mixture. When the organic solvent is used in a mixture of two or more, the mixture ratio may be controlled according to desirable battery performance.

In addition, in the case of the carbonate-based solvent, a mixture of a cyclic carbonate and a chain carbonate may be used. When the cyclic carbonate and the chain carbonate are mixed in a volume ratio of about 1:1 to about 1:9, the electrolyte may exhibit excellent performance.

The non-aqueous organic solvent may further include an aromatic hydrocarbon-based organic solvent in addition to the carbonate-based solvent. The carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by Chemical Formula I may be used.

Chemical Formula I

In Chemical Formula I, $R^4$ to $R^9$ are the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an ethylene carbonate-based compound represented by Chemical Formula II to improve cycle-life of a battery in addition to the aforementioned vinylene carbonate.

Chemical Formula II

In Chemical Formula II, $R^{10}$ and $R^{11}$ are the same or different and are selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both of $R^{10}$ and $R^{11}$ are not hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide; LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, (wherein x and y are natural numbers, for example, an integer ranging from 1 to 20), lithium difluoro (bisoxalato) phosphate, LiCl, LiI, $LiB(C_2O_4)_2$ (lithium bis (oxalato) borate; LiBOB), and lithium difluoro(oxalato) borate (LiDFOB).

The lithium salt may be used in a concentration ranging from about 0.1 M to about 2.0 M. When the lithium salt is included at this concentration range, the electrolyte may have excellent performance and lithium ion mobility due to optimal electrolyte conductivity and viscosity.

Positive Electrode

The positive electrode for a rechargeable lithium battery according to an embodiment may include a current collector and a positive electrode active material layer on the current collector. The positive electrode active material layer may include a positive electrode active material and may further include a binder and/or a conductive material.

The positive electrode active material may be a compound (lithiated intercalation compound) capable of intercalating and deintercallating lithium. Examples of the positive electrode active material may be a compound represented by one of chemical formulas:

$Li_aA_{1-b}X_bD_2$ (0.90≤a≤1.8, 0≤b≤0.5);

$Li_aA_{1-b}X_bO_{2-c}D_c$ (0.90≤a≤1.8, 0≤b≤0.5, 0≤c≤0.05);

$Li_aE_{1-b}X_bO_{2-c}D_c$ (0.90≤a≤1.8, 0≤b≤0.5, 0≤c≤0.05);

$Li_aE_{2-b}X_bO_{4-c}D_c$ (0.90≤a≤1.8, 0≤b≤0.5, 0≤c≤0.05);

$Li_aNi_{1-b-c}Co_bX_cD_\alpha$ (0.90≤a≤1.8, 0≤b≤0.5, 0≤c≤0.5, 0<α≤2);

$Li_aNi_{1-b-c}Co_bX_cO_{2-\alpha}T_\alpha$ (0.90≤a≤1.8, 0≤b≤0.5, 0≤c≤0.05, 0<α<2);

$Li_aNi_{1-b-c}Co_bX_cO_{2-\alpha}T_2$ (0.90≤a≤1.8, 0≤b≤0.5, 0≤c≤0.05, 0<α<2);

$Li_aNi_{1-b-c}Mn_bX_cD_\alpha$ (0.90≤a≤1.8, 0≤b≤0.5, 0≤c≤0.05, 0<α≤2);

$Li_aNi_{1-b-c}Mn_bX_cO_{2-\alpha}T_\alpha$ (0.90≤a≤1.8, 0≤b≤0.5, 0≤c≤0.05, 0<α<2);

$Li_aNi_{1-b-c}Mn_bX_cO_{2-\alpha}T_2$ (0.90≤a≤1.8, 0≤b≤0.5, 0≤c≤0.05, 0<α<2);

$Li_aNi_bE_cG_dO_2$ (0.90≤a≤1.8, 0≤b≤0.9, 0≤c≤0.5, 0.001≤d≤0.1);

$Li_aNi_bCo_cMn_dG_eO_2$ (0.90≤a≤1.8, 0≤b≤0.9, 0≤c≤0.5, 0≤d≤0.5, 0.001≤e≤0.1);

$Li_aNiG_bO_2$ (0.90≤a≤1.8, 0.001≤b≤0.1);

$Li_aCoG_bO_2$ (0.90≤a≤1.8, 0.001≤b≤0.1);

$Li_aMn_{1-b}G_bO_2$ (0.90≤a≤1.8, 0.001≤b≤0.1);

$Li_aMn_2G_bO_4$ (0.90≤a≤1.8, 0.001≤b≤0.1);

$Li_aMn_{1-g}G_gPO_4$ (0.90≤a≤1.8, 0≤g≤0.5);

$QO_2$; $QS_2$; $LiQS_2$;

$V_2O_5$; $LiV_2O_5$;

$LiZO_2$;

$LiNiVO_4$;

$Li_{(3-f)}J_2(PO_4)_3$ (0≤f≤2);

$Li_{(3-f)}Fe_2(PO_4)_3$ (0≤f≤2);

$Li_aFePO_4$ (0.90≤a≤1.8).

In the following chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

For example, the positive electrode active material may include a lithium nickel-based composite oxide. The lithium nickel-based composite oxide may be represented by Chemical Formula III.

$Li_{a1}Ni_{x1}M^1_{y1}M^2_{1-x1-y1}O_{2-z}X_z$      Chemical Formula III In Chemical Formula III, 0.9≤a1≤1.8, 0.3≤x1≤1, 0≤y1≤0.7, and 0≤z≤0.1, $M^1$ and $M^2$ are each independently Al, B, Ba, Ca, Ce, Co, Cr, Cu, Fe, Mg, Mn, Mo, Nb, Si, Sr, Ti, V, W, Zr, or a combination thereof, and X is F, P, S, or a combination thereof.

In Chemical Formula III, 0.4≤x1≤1 and 0≤y1≤0.6, 0.5≤x1≤1 and 0≤y1≤0.5, 0.6≤x1≤1 and 0≤y1≤0.4, or 0.7≤x1≤1 and 0≤y1≤0.3, 0.8≤x1≤1 and 0≤y1≤0.2, or 0.9≤x1≤1 and 0≤y1≤0.1.

The lithium nickel-based composite oxide may be, for example, represented by Chemical Formula IV.

$Li_{a2}Ni_{x2}Co_{y2}M^3_{1-x2-y2}O_{2-z}X_z$  Chemical Formula IV

In Chemical Formula IV, 0.9≤a2≤1.8, 0.3≤x2<1, 0<y2≤0.7, and 0≤z≤0.1, $M^3$ is Al, B, Ba, Ca, Ce, Cr, Cu, Fe, Mg, Mn, Mo, Nb, Si, Sr, Ti, V, W, Zr, or a combination thereof, and X is F, P, S, or a combination thereof.

In Chemical Formula IV, 0.3≤x2≤0.99 and 0.01≤y2≤0.7, 0.4≤x2≤0.99 and 0.01≤y2≤0.6, 0.5≤x2≤0.99 and 0.01≤y2≤0.5, or 0.6≤x2≤0.99 and 0.01≤y2≤0.4, 0.7≤x2≤0.99 and 0.01≤y2≤0.3, 0.8≤x2≤0.99 and 0.01≤y2≤0.2, or 0.9≤x2≤0.99 and 0.01≤y2≤0.1.

The positive electrode active material may have a coating layer on the surface of the aforementioned compounds. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Al, As, B, Ca, Co, Fe, Ga, Ge, K, Mg, Na, Si, Sn, Ti, V, Zr, or a combination thereof. The coating layer forming process may be dry or wet; for example, spray coating, dipping, etc. may be used.

The positive electrode active material may include particles containing lithium transition metal composite oxide and a boron coating layer on the surface of the particles. For example, the positive electrode active material may include a secondary particle including lithium transition metal composite oxide and a plurality of aggregated primary particles and a boron coating layer on the surface of the particles. In such an embodiment, gas generation during overvoltage charging may be increased and overcharge safety may be further improved. For example, the boron coating layer in the positive electrode active material may contribute to generating a large amount of gas by reacting with vinylene carbonate in the electrolyte during overvoltage charging of greater than or equal to 4.7 V.

The boron coating layer may be uniformly coated on the surface of the secondary particle. The boron coating layer may include lithium borate, and the lithium borate may be expressed as lithium boron oxide. The lithium borate may include, for example $LiBO_2$, $Li_3B_7O_{12}$, $Li_6B_4O_9$, $Li_3B_{11}O_{18}$, $Li_2B_4O_7$, $Li_3BO_3$, $Li_8B_6O_{13}$, $Li_5B_3O_7$, $Li_4B_2O_5$, $Li_{10}B_4O_{11}$, $Li_8B_2O_7$, or a combination thereof. For example, the lithium borate of the boron coating layer may include $LiBO_2$.

A content of lithium borate in the boron coating layer may be about 0.01 wt % to about 3 wt %, for example 0.01 wt % to about 2 wt %, 0.01 wt % to about 1 wt %, or 0.01 wt % to about 0.5 wt % based on the total weight of the positive electrode active material. At these ranges, the boron coating layer does not increase resistance and increases structural stability of the positive electrode active material to improve cycle-life characteristics while at the same time improves overcharge safety.

The positive electrode active material may include, in addition to the boron coating layer, a boron doping layer inside the primary particles exposed on the surface of the secondary particles. The boron doping layer may be said to be disposed inside the secondary particles. The primary particles exposed to the surface of the secondary particle may refer to primary particles in the outermost portion of the secondary particle. For example, the boron doping layer may be disposed within a depth range of 10 nm from the outer surface of the primary particles exposed to the surface of the secondary particles. If the outer surface of the primary particles exposed to the surface of the secondary particles is 0 nm, it can be said that the doping layer exists in a depth range of 0 nm to 10 nm starting from the surface. In other words, the boron doping layer may be present within a depth range of about 10 nm from the surface of the secondary particles. When the secondary particle surface is about 0 nm, the doping layer may be present within a depth range of about 0 nm to about 10 nm from the surface.

The boron doping layer may be present, for example, within a depth range of about 9 nm, about 8 nm, about 7 nm, about 6 nm, about 5 nm, about 4 nm, about 3 nm, or about 2.5 nm from the outer surface of the primary particles exposed to the surface of the secondary particles. This boron doping layer may be distinguished from the boron coating layer and also from the grain boundary boron coating portion, to be described later, and thus, contributes to structural stability of the positive electrode active material.

The positive electrode active material may further include a grain boundary boron coating portion that is disposed on the surface of the primary particles inside the secondary particles and includes lithium borate in addition to the aforementioned boron coating layer and boron doping layer. This grain boundary boron coating portion is present not on the surface of the secondary particles but inside the secondary particles and may be coated along the interface of the primary particles. Herein, the inner portion of the secondary particles means the entire interior except for the surface, for example, the entire interior from the outer surface to a depth of about 2 μm, or a portion where distilled water does not reach when the positive electrode active material secondary particles are washed with the distilled water.

According to an embodiment, a weight of the boron coating layer is greater than a weight of the grain boundary boron coating portion. For example, based on a total amount of the boron coating layer and the grain boundary boron coating portion, the grain boundary boron coating portion may be included in an amount of about 2 wt % to about 30 wt %, specifically, about 3 wt % to about 25 wt %, or about 5 wt % to about 20 wt %, and in addition, the boron coating layer may be included in an amount of about 70 wt % to about 98 wt %, about 75 wt % to about 97 wt %, about 80 wt % to about 95 wt %, or the like. For example, the boron coating layer and the grain boundary boron coating portion may have a weight ratio of about 70:30 to about 98:2, for example, about 75:25 to about 97:3, or about 80:20 to about 95:5. When the boron coating layer and the grain boundary boron coating portion are included within the above content ratios, boron may not increase resistance and may improve performance while also improving capacity characteristics and cycle-life characteristics of the rechargeable lithium battery.

A content of the lithium borate of the grain boundary boron coating portion may be about 0.001 wt % to about 0.05 wt %, for example about 0.001 wt % to about 0.04 wt %, about 0.002 wt % to about 0.03 wt %, or about 0.003 wt % to about 0.02 wt % based on the total weight of the positive electrode active material but is not limited thereto.

The positive electrode active material layer may further include a binder and/or a conductive material in addition to the aforementioned positive electrode active material.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

A content of the binder in the positive electrode active material layer may be about 1 wt % to about 5 wt % based on the total weight of the positive electrode active material layer.

The conductive material is included to provide electrode conductivity. Any electrically conductive material may be used as a conductive material unless it causes a chemical change. Examples of the conductive material may include a carbon-based material, such as natural graphite, artificial graphite, carbon black, such as KetjenBlack, acetylene black, a carbon fiber, a carbon nanofiber, carbon nanotube, and the like; a metal-based material of a metal powder or a metal fiber including copper, nickel, aluminum, silver, and the like; a conductive polymer, such as a polyphenylene derivative; or a mixture thereof.

A content of the conductive material in the positive electrode active material layer may be about 1 wt % to about 5 wt % based on the total weight of the positive electrode active material layer.

An aluminum foil may be used as the current collector but is not limited thereto.

Negative Electrode

The negative electrode for a rechargeable lithium battery may include, for example, a current collector and a negative electrode active material layer on the current collector. The negative electrode active material layer may include a negative electrode active material and may further include a binder and a conductive material.

The negative electrode active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example, crystalline carbon, amorphous carbon, or a combination thereof as a carbon-based negative electrode active material. The crystalline carbon may be non-shaped, or sheet, flake, spherical, or fiber shaped natural graphite or artificial graphite. The amorphous carbon may be a soft carbon, a hard carbon, a mesophase pitch carbonization product, calcined coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material or a Sn-based negative electrode active material. The Si-based negative electrode active material may include silicon, a silicon-carbon composite, $SiO_x$ (0<x<2), a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative electrode active material may include Sn, $SnO_2$, Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn). At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin, such as a phenol resin, a furan resin, or a polyimide resin. In this case, the content of silicon may be about 10 wt % to about 50 wt % based on the total weight of the silicon-carbon composite. In addition, the content of the crystalline carbon may be about 10 wt % to about 70 wt % based on the total weight of the silicon-carbon composite, and the content of the amorphous carbon may be about 20 wt % to about 40 wt % based on the total weight of the silicon-carbon composite. In addition, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic content ratio of Si:O in the silicon particles indicating a degree of oxidation may be about 99:1 to about 33:67. The silicon particles may be $SiO_x$ particles, and in this case, the range of x in $SiO_x$ may be greater than about 0 and less than about 2. As used herein, when a definition is not otherwise provided, an average particle diameter (D50) indicates a particle where an accumulated volume is about 50 volume % in a particle distribution.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and used, the mixing ratio may be a weight ratio of about 1:99 to about 90:10.

In the negative electrode active material layer, the negative electrode active material may be included in an amount of about 95 wt % to about 99 wt % based on the total weight of the negative electrode active material layer.

In an embodiment, the negative electrode active material layer may further include a binder and may further include a conductive material. The content of the binder in the negative electrode active material layer may be about 1 wt % to about 5 wt % based on the total weight of the negative electrode active material layer. In addition, when the conductive material is included, the negative electrode active material layer may include about 90 wt % to about 98 wt % of the negative electrode active material, about 1 wt % to about 5 wt % of the binder, and about 1 wt % to about 5 wt % of the conductive material.

The binder acts to adhere the negative electrode active material particles to each other and also to adhere the negative electrode active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamide imide, polyimide, or a combination thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluoro rubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting viscosity may be further included. As the cellulose-based compound, one or more of carboxymethyl cellulose, hydroxypropyl methylcellulose, methyl cellulose, or alkali metal salts thereof may be mixed and used. As the alkali metal, Na, K or Li may be used. The amount of such a thickener used may be about 0.1 parts by weight to about 3 parts by weight based on 100 parts by weight of the negative electrode active material.

The conductive material is included to provide electrode conductivity. Any electrically conductive material may be used as a conductive material unless it causes a chemical change. Examples of the conductive material include a carbon-based material, such as natural graphite, artificial graphite, carbon black, such as KetjenBlack, acetylene black, a carbon fiber, a carbon nanofiber, carbon nanotube, and the like; a metal-based material of a metal powder or a metal fiber including copper, nickel, aluminum silver, and the like; a conductive polymer, such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

Separator

The separator separates the positive electrode and the negative electrode and provides a transporting passage for lithium ions and may be any generally-used separator in a lithium ion battery. For example, the separator may have low resistance to ion transport and excellent impregnation for an electrolyte. The separator may be selected from a glass fiber, polyester, polytetrafluoroethylene (e.g., Teflon), polyethylene, polypropylene, or a combination thereof. The separator may be a non-woven fabric or a woven fabric. For example, in a lithium ion battery, a polyolefin-based polymer separator, such as polyethylene and polypropylene, may be primarily used. To ensure the heat resistance and/or mechanical strength, a coated separator including a ceramic component or a polymer material may be used. The separator may have a mono-layer or multi-layer structure.

Rechargeable Lithium Battery

A rechargeable lithium battery may be classified as a lithium ion battery, a lithium ion polymer battery, a lithium polymer battery, or all-solid-state battery depending on the presence or absence of a separator and type of electrolyte. According to the shape, a rechargeable lithium battery may be classified as a cylindrical shape, a square shape, a coin type, a pouch type, and the like.

Figure 1:
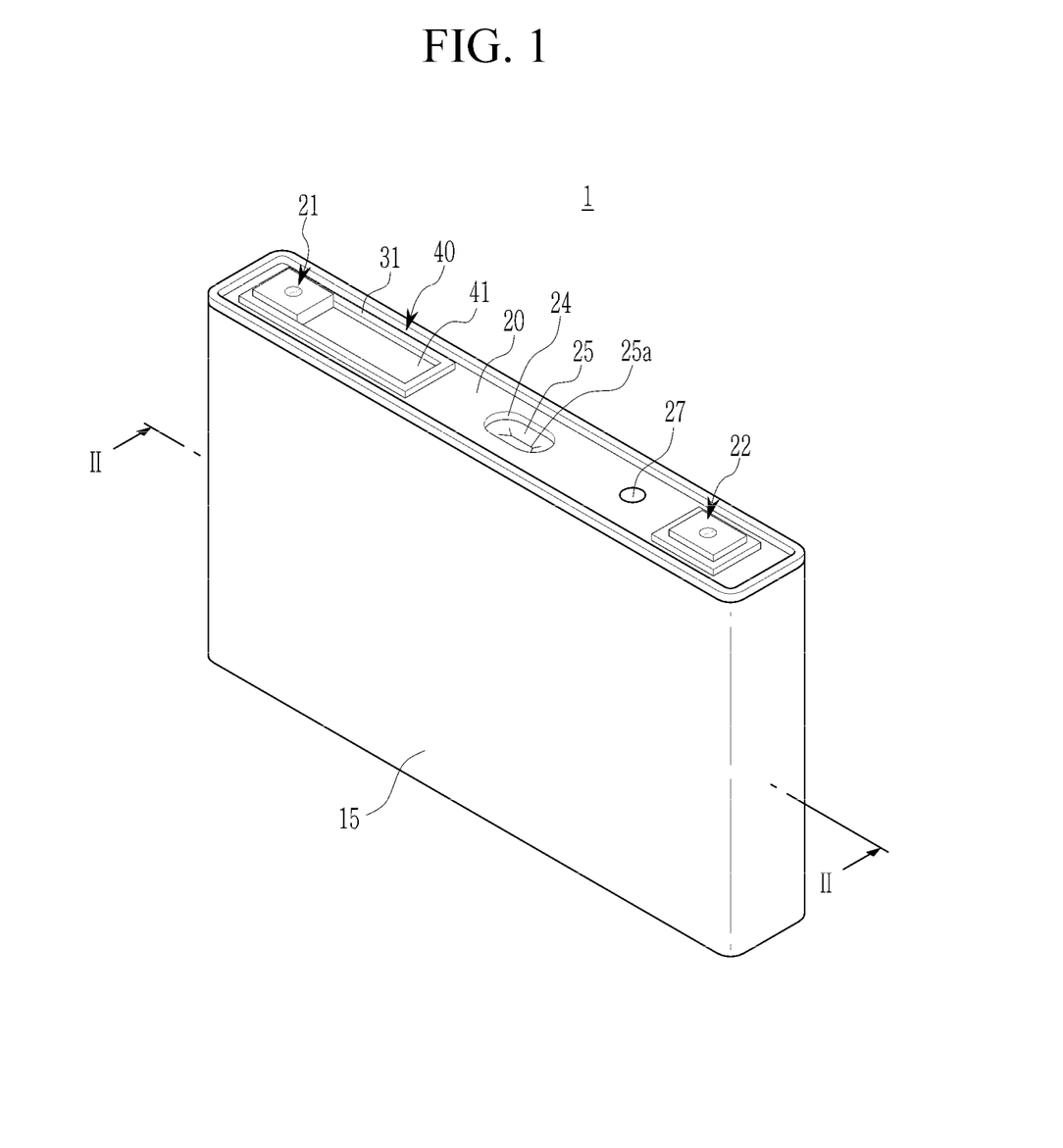
FIG. 1 is a perspective view schematically illustrating a rechargeable lithium battery according to an embodiment.
Figure 2:
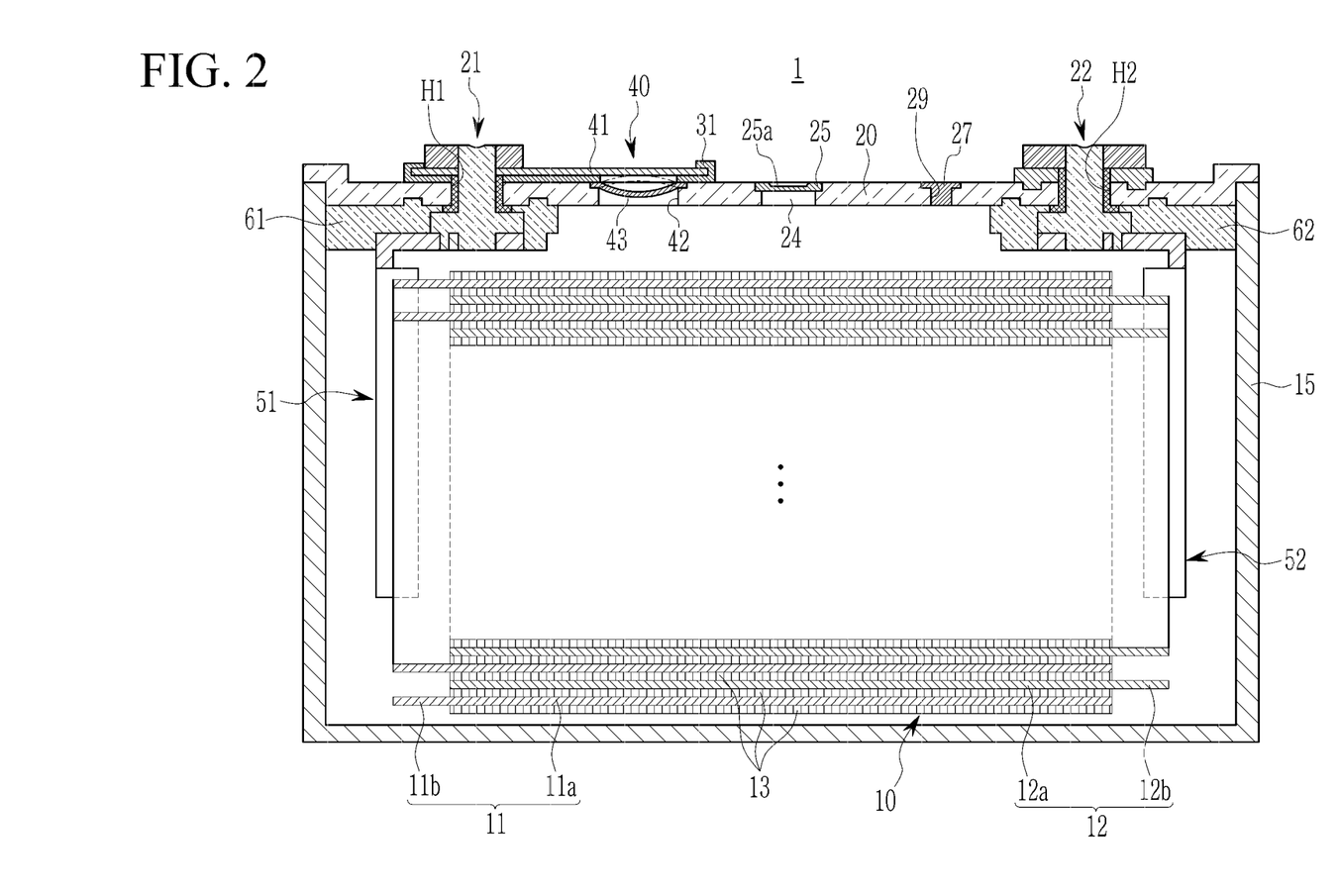
FIG. 2 is a cross-sectional view of the rechargeable lithium battery taken along the line II-II in FIG. 1.

FIG. 1 is a perspective view of a rechargeable lithium battery according to an embodiment, and FIG. 2 is a cross-sectional view taken along the line II-II of FIG. 1. Referring to FIGS. 1 and 2, the rechargeable lithium battery 1 includes an electrode assembly 10 for charging and discharging current, a case 15 containing (or accommodating) the electrode assembly 10, and a cap plate 20 sealing an opening in the case 15. The rechargeable lithium battery 1 may further include electrode terminals (e.g., negative and positive terminals) 21 and 22 installed on the cap plate 20 and may further include an overcharge safety device 40. The overcharge safety device 40 may operate when an internal pressure of the rechargeable lithium battery is greater than or equal to about 7 $kgf/cm^2$.

The electrode assembly 10 is formed by disposing a negative electrode 11 and a positive electrode 12 on both surfaces of a separator 13, which is an electrical insulating material, and winding the negative electrode 11, the separator 13, and the positive electrode 12 in a jelly roll state. The electrode assembly may be formed in a stack type in which a negative electrode, a separator, and a positive electrode are stacked. The negative electrode 11 and the positive electrode 12 respectively include a coating portion 11a and 12a coated with an active material on a collector of a metal plate and an uncoated region 11b and 12b not coated with the active material to expose the collector. The uncoated region 11b of the negative electrode 11 is formed at one end of the wound negative electrode 11, and the uncoated region 12b of the positive electrode 12 is formed at one end of the wound positive electrode 12. The uncoated regions 11b and 12b are respectively disposed both ends (e.g., opposite ends) of the electrode assembly 10.

The cap plate 20 is installed in an opening in the case 15 and closes and seals the case 15. For example, the case 15 and the cap plate 20 may be formed of aluminum and welded each other. In addition, the cap plate 20 may have a vent hole (e.g., a vent opening) 24 and terminals H1 and H2. The vent hole 24 may be a vent through which internal gas may be discharged when an internal pressure of the rechargeable lithium battery 1 is extremely increased due to the overcharge, an accident, or the like. The vent hole 24 may be closed and sealed with a vent plate 25, and when the internal pressure of the rechargeable lithium battery 1 goes beyond a reference pressure, that is, reaches an excessive pressure, the vent plate 25 bursts to open the vent hole 24. The vent plate 25 may have a notch 25a to facilitate the bursting.

The negative and positive terminals 21 and 22 are respectively installed in the terminal holes H1 and H2 of the cap plate 20 and are electrically connected to the electrode assembly 10. For example, the negative and positive terminals 21 and 22 are respectively electrically connected to the negative and positive electrodes 11 and 12 of the electrode assembly 10. Accordingly, the electrode assembly 10 is drawn out of the case 15 through the negative and positive terminals 21 and 22. Negative and positive electrode insulation members 61 and 62 are respectively installed between each negative and positive electrode lead tab 51 and 52 and the cap plate 20 to electrically insulate the negative and positive electrode lead tabs 51 and 52 from the cap plate 20.

An electrolyte inlet 29 is formed in the cap plate 20 to inject an electrolyte solution in the interior of the case 15 after coupling the cap plate 20 to the case 15. After injecting the electrolyte solution, the electrolyte inlet 29 is sealed with a sealing plug 27.

The overcharge safety device 40 is a device that is configured to block a current by implementing an external short circuit when an internal pressure of the rechargeable lithium battery 1 increases due to gas generated due to an overcharge.

The overcharge safety device may be, for example, a device for inducing a short circuit when the internal pressure of the battery increase, that is, a pressure response circuit or a pressure-response circuit opening device for inducing an open circuit when the internal pressure of the battery substantially increases.

The pressure-response circuit opening device is a current interrupting device that blocks charging when the internal pressure inside the battery exceeds a reference value due to problems such as when the temperature thereof is higher than a reference value or when a voltage of the battery is higher than a reference value, and the like. The pressure-response circuit opening device may be configured to, when a battery internal pressure excessively rises, make a metal plate on outer walls of the case expand upwardly and, thus, block external and internal electric circuits. When gas is rapidly generated during the overcharge in the rechargeable lithium battery according to an embodiment, the open circuit device quickly operates such that the battery may be no longer charged, effectively blocking it from the overcharge.

The pressure-response short circuit device may induce an internal short circuit and discharge the electrode when the gas pressure inside the battery exceeds a reference value due to problems, such as when a temperature of the battery exceeds a reference value or a voltage of the battery becomes greater than or equal to a reference value. The pressure-response short circuit device may be configured to, for example, generate a short circuit between positive and negative electrodes when a battery internal pressure excessively rises and makes a metal panel attached on outer walls of the case expands upwardly and contact with a part of the battery having a different potential. The rechargeable lithium battery according to an embodiment may be effectively prevented from the overcharge when gas is rapidly generated in the battery during the overvoltage charging and, thus, ensures the pressure-response short circuit device quickly operates and electrode plates discharged. When the pressure-response short circuit device operates, the rechargeable lithium battery may include a thermal cutoff (TCO) device, such as a fuse, a positive thermal cutoff (PTC), a bimetal, a breaker, and the like to control heat generation due to the discharging.

In FIGS. 1 and 2, the overcharge safety device 40 may be regarded as a type of a pressure-response short circuit device. The overcharge safety device 40 includes a short-circuit tab 41 and a short-circuit member 43 spaced apart or shorted from each other. The short-circuit tab 41 is electrically connected to the negative terminal 21 and disposed outside the cap plate 20 with an insulation member 31 interposed therebetween. The insulation member 31 is installed between the short-circuit tab 41 and the cap plate 20 to electrically insulate the short-circuit tab 41 and the cap plate 20. For example, the cap plate 20 is electrically insulated from the negative terminal 21.

The short-circuit member 43 is installed in a short-circuit hole (e.g., a short-circuit opening) 42 formed in the cap plate 20. The short-circuit tab 41 is connected to the negative terminal 21 and extends along the outside of the short-circuit member 43. Therefore, the short-circuit tab 41 and the short-circuit member 43 correspond to (e.g., overlap) each other in the short-circuit hole 42, face each other, and maintain a spaced state. When the internal pressure of the rechargeable lithium battery 1 increases and reaches an excessive pressure due to overcharging, etc., a curvature of the short-circuit member 43 is reversed to form a short-circuit state. For example, in the overcharge safety device 40, when the internal pressure of the rechargeable lithium battery 1 exceeds about 10 kgf/cm$^2$, the short-circuit member 43 is reversed (or inverted) to induce an external short circuit.

The coating portion including the aforementioned lithium borate particles may be disposed without limitation as long as it contacts the electrolyte in the interior of the case. For example, the coating portion may be disposed on at least one of the inner wall surface of the case 15 and the inner wall surface of the cap plate 20 shown in FIG. 2. In such an embodiment, when charging is carried out with an overvoltage of about 4.5 V to about 5.0 V, for example, about 4.7 V or more, a large amount of gas is generated due to the reaction between the coating portion and vinylene carbonate in the electrolyte, and an accident, such as an explosion can be prevented by effectively and quickly cutting off the current through an overcharging safety device or the like.

Hereinafter, examples of the present disclosure and comparative examples are described. It is to be understood, however, that the examples are for the purpose of illustration and are not to be construed as limiting the present disclosure.

Example 1

1. Manufacture of Positive Electrode 96 wt % of $LiNi_{0.945}Co_{0.04}Al_{0.015}O_2$ as a positive electrode active material, 2 wt % of polyvinylidene fluoride, 2 wt % of carbon nanotube, and N-methylpyrrolidone as a solvent were mixed in a mixer, preparing slurry for forming a positive electrode active material layer. The slurry for forming a positive electrode active material layer was coated on an aluminum foil into an electrode plate and then, roll-pressed and dried, thereby manufacturing a positive electrode.

2. Manufacture of Negative Electrode 97.3 wt % of graphite as a negative electrode active material, 0.5 wt % of denka black, 0.9 wt % of carboxylmethyl cellulose, and 1.3 wt % of a styrene butadiene rubber were mixed in an aqueous solvent, preparing negative electrode active material slurry. The negative electrode active material slurry was coated on a copper foil and then, dried and roll-pressed, thereby manufacturing a negative electrode.

3. Manufacture of Battery Cell $LiBO_2$ particles having an average particle diameter adjusted into 10 μm or less were dispersed in an NMP solvent to prepare lithium borate slurry, and the lithium borate slurry was coated on an inner wall of a cap plate of a battery case and vacuum-dried to form a coating portion, thereby obtaining the battery case in which the coating portion was formed according to embodiments of the present disclosure.

The prepared positive electrode, a separator with a polyethylene/polypropylene multi-layer structure, and the prepared negative electrode were sequentially stacked into an electrode assembly and then inserted into the case having the coating portion and equipped with a vent and an overcharge safety device, and an electrolyte was injected thereinto, thereby manufacturing a rechargeable lithium battery cell. The electrolyte was prepared by mixing ethylene carbonate, ethyl methyl carbonate, and dimethyl carbonate in a volume ratio of 2:4:4 and adding 1.1 M of $LiPF_6$ lithium salt to the mixed solvent to prepare an electrolyte solution and then adding 1.5 parts by weight of vinylene carbonate based on 100 parts by weight of the electrolyte solution thereto.

Example 2

A battery cell was manufactured in the same manner as Example 1 except that the coating portion was formed by coating lithium borate slurry on the inner wall of the case.

Comparative Example 1

A battery cell was manufactured in the same manner as Example 1 except that the coating portion containing lithium borate was not formed in (or applied to) the case.

Evaluation Example 1: 5 V Overcharge Evaluation

Figure 3:
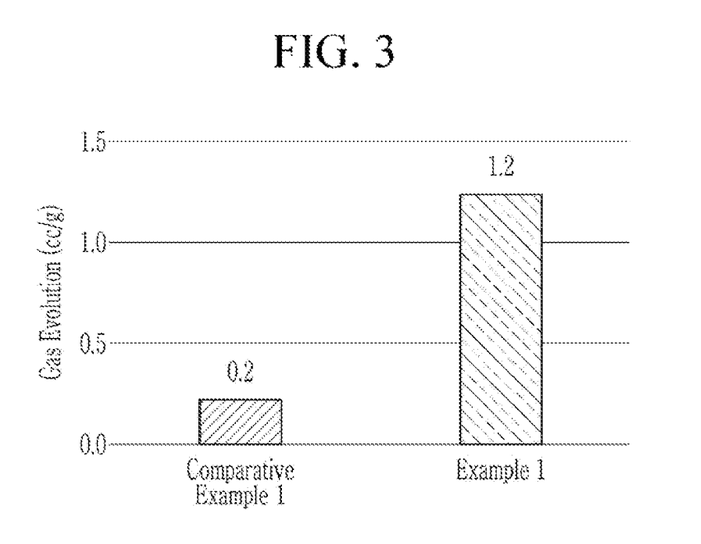
FIG. 3 is a graph showing an amount of gas generated per weight of the battery when the battery cells of Example 1 and Comparative Example 1 were charged with an overvoltage of 5 V.

The cells according to Example 1 and Comparative Example 1 were constant current-charged to 5 V at 0.5 C-rate and cut off at 0.1 C at 25° C. Herein, a generated gas amount per battery weight (cc/g) was measured, and the results are shown in FIG. 3. As for a C rate of the overcharge, based on estimated capacity, capacity measured by conducting a constant current charge at a 0.2 C rate to 4.3 V, a constant voltage charge to a current of 0.05 C and then, 10 minutes' pause, and a constant current discharge at 0.2 C rate to 3 V as a reference of 1 C rate.

Referring to FIG. 3, Comparative Example 1, which charged at an overvoltage of 5 V, exhibited a relatively low gas generation amount of 0.2 cc/g, which caused a problem of insufficiently increasing an internal pressure of the battery cell such an overcharge safety device was not effectively operated. On the other hand, Example 1 exhibited a relatively high gas generated amount of 1.2 cc/g, which sufficiently increased an internal pressure of the battery cell as to rapidly operate the overcharge safety device during the overvoltage charge.

Evaluation Example 2: Current Evaluation During Overvoltage Charging

A positive electrode was prepared by coating $LiBO_2$ on an aluminum foil and punching it into a 14 mm circle and then, used with lithium as a negative electrode, manufacturing a three-electrode beaker cell. In this beaker, the same electrolyte solution including vinylene carbonate as used in Example 1 was added and then checked with respect to current changes, while increasing a voltage at a predetermined rate, which was referred to as Reference Example A. In addition, a cell of Reference Example B was prepared in the same manner as Reference Example A except that an electrolyte solution including no vinylene carbonate was used. The cells of Reference Examples A and B were measured with respect to the current changes, while a voltage was increased from 3 V to 7 V at a rate of 0.1 mV/sec at 25° C., and the results are shown in FIG. 4.

Figure 4:
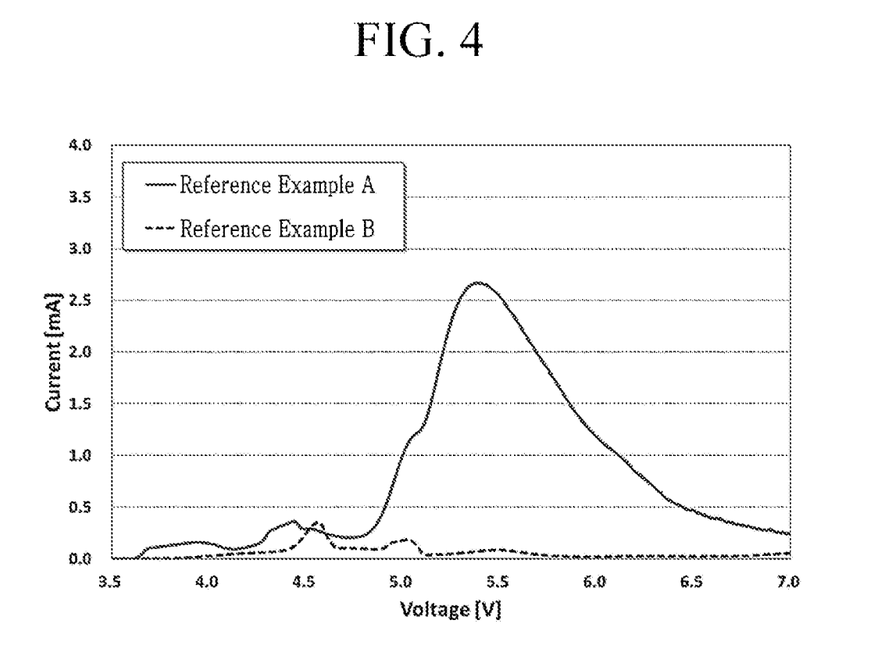
FIG. 4 is a graph showing changes in current while increasing the voltage at a constant rate for the battery cells of Reference Examples A and B.

Referring to FIG. 4, Reference Example A exhibited a sharp current rise from about 4.7 V, but Reference Example B including no vinylene carbonate exhibited no current change to 7 V. Accordingly, an increase in the generated gas amount, as shown in FIG. 3, was confirmed due to the effect of lithium borate in the interior of the case and vinylene carbonate included in the electrolyte solution.

While this disclosure has been described in connection with what is presently considered to be practical embodiments, it is to be understood that the present disclosure is not limited to the described embodiments. On the contrary, the present disclosure is intended to cover various modifications and equivalent arrangements included within the spirit and scope of the appended claims and their equivalents.

| Description of Some Symbols | |
|---|---|
| 1: | rechargeable lithium battery |
| 10: | electrode assembly |
| 11: | negative electrode |
| 12: | positive electrode |
| 11a: | negative electrode active material coating portion |
| 11b: | negative uncoated region |
| 12a: | positive electrode active material coating portion |
| 12b: | positive uncoated region |
| 13: | separator |
| 15: | case |
| 20: | cap plate |
| 21: | negative terminal |
| 22: | positive terminal |
| 24: | vent hole |
| 25: | vent plate |
| 25a: | notch |
| 27: | sealing plug |
| 29: | electrolyte inlet |
| 31: | insulation member |
| 40: | overcharge safety device |
| 41: | short-circuit tab |
| 43: | short-circuit member |
| 51: | negative electrode lead tab |
| 52: | positive electrode lead tab |
| 61: | negative electrode insulation member |
| 62: | positive electrode insulation member |
| H1, H2: | terminal hole |

What is claimed is:

1. A rechargeable lithium battery comprising
a positive electrode;
a negative electrode;
a separator between the positive electrode and the negative electrode;
an electrolyte comprising vinylene carbonate; and
a case accommodating the positive electrode, the negative electrode, the separator, and the electrolyte, the case comprising a coating portion on at least a portion of an interior thereof, the coating portion containing lithium borate particles.

2. The rechargeable lithium battery of claim 1, wherein in the rechargeable lithium battery, an amount of gas generated per battery weight is greater than or equal to about 1.0 cc/g in a 5.0 V overcharge evaluation.

3. The rechargeable lithium battery of claim 1, wherein the case comprises an overcharge safety device.

4. The rechargeable lithium battery of claim 3, wherein the overcharge safety device is configured to operate when an internal pressure inside the case is greater than or equal to 7 $kgf/cm^2$.

5. The rechargeable lithium battery of claim 3, wherein the overcharge safety device is configured to induce a circuit opening when an internal pressure of the battery exceeds a reference value.

6. The rechargeable lithium battery of claim 3, wherein the overcharge safety device is configured to induce a short circuit when an internal pressure of the battery exceeds a reference value.

7. The rechargeable lithium battery of claim 1, wherein the lithium borate particle comprises $LiBO_2$, $Li_3B_7O_{12}$, $Li_6B_4O_9$, $Li_3B_{11}O_{18}$, $Li_2B_4O_7$, $Li_3BO_3$, $Li_8B_6O_{13}$, $Li_5B_3O_7$, $Li_4B_2O_5$, $Li_{10}B_4O_{11}$, $Li_8B_2O_7$, or a combination thereof.

8. The rechargeable lithium battery of claim 1, wherein an average particle diameter of the lithium borate particles is less than or equal to 10 μm.

9. The rechargeable lithium battery of claim 1, wherein the coating portion contacts the electrolyte.

10. The rechargeable lithium battery of claim 1, wherein the coating portion is on at least one of an inner wall of the case and a cap plate.

11. The rechargeable lithium battery of claim 1, wherein the vinylene carbonate is included in an amount of about 0.1 wt % to about 5 wt % based on a total weight of the electrolyte.

12. The rechargeable lithium battery of claim 1, wherein the positive electrode comprises a positive electrode active material, the positive electrode active material comprising particles comprising a lithium transition metal composite oxide, and a boron coating layer on the surface of the particles.

13. The rechargeable lithium battery of claim 12, wherein the boron coating layer comprises lithium borate and the lithium borate comprises $LiBO_2$, $Li_3B_7O_{12}$, $Li_6B_4O_9$, $Li_3B_{11}O_{18}$, $Li_2B_4O_7$, $Li_3BO_3$, $Li_8B_6O_{13}$, $Li_5B_3O_7$, $Li_4B_2O_5$, $Li_{10}B_4O_{11}$, $Li_8B_2O_7$, or a combination thereof.

* * * * *